(12) United States Patent  
Liu

(10) Patent No.: US 11,627,508 B2  
(45) Date of Patent: Apr. 11, 2023

(54) SESSION PROCESSING METHOD AND DEVICE, COMPUTER STORAGE MEDIUM

(71) Applicant: GUANGDONG OPPO MOBILE TELECOMMUNICATIONS CORP., LTD., Dongguan (CN)

(72) Inventor: Jianhua Liu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 132 days.

(21) Appl. No.: 17/031,882

(22) Filed: Sep. 24, 2020

(65) Prior Publication Data

US 2021/0014756 A1 Jan. 14, 2021

Related U.S. Application Data

(63) Continuation of application No. PCT/CN2018/116549, filed on Nov. 20, 2018.

(30) Foreign Application Priority Data

May 21, 2018 (CN) .......................... 201810491348.3  
Jun. 15, 2018 (CN) .......................... 201810621962.7  
(Continued)

(51) Int. Cl.  
*H04W 4/00* (2018.01)  
*H04W 36/08* (2009.01)  
*H04W 36/00* (2009.01)

(52) U.S. Cl.  
CPC ........ *H04W 36/08* (2013.01); *H04W 36/0011* (2013.01)

(58) Field of Classification Search  
CPC ..................... H04W 36/08; H04W 36/0011  
See application file for complete search history.

(56) References Cited

U.S. PATENT DOCUMENTS

2012/0096520 A1 4/2012 Dutta et al.  
2016/0192261 A1* 6/2016 Wang ................ H04W 36/0055  
370/331  
(Continued)

FOREIGN PATENT DOCUMENTS

CN 102387557 A 3/2012  
CN 104822169 A 8/2015  
(Continued)

OTHER PUBLICATIONS

The First Office Action issued in corresponding Chinese Application No. 202010500023.4, dated Jun. 21, 2021, 20 pages.  
(Continued)

*Primary Examiner* — Justin Y Lee  
(74) *Attorney, Agent, or Firm* — Bayes PLLC

(57) ABSTRACT

Provided are session processing method, device, and computer storage medium. The method includes performing at least one of a first type transmission, a first type handover process on the PDU session, or the data stream in the PDU session. The first type of transmission includes at least one of the network side and the terminal side perform data copy type transmission on the data packet through multiple paths, or perform the first priority transmission on the data packet. The first priority transmission refers to that the transmitted data stream corresponds to a set of specific QoS parameters. The first type of handover process includes before the air interface data radio bearer is handover from the first base station to the second base station. The second core network element completes the establishment of a first path with the first base station and the establishment of a second path with the second base station. The first type of handover process also includes after the air interface data radio bearer is handover from the first base station to the second base  
(Continued)

performing a first type transmission and/or a first type handover process on the PDU session and/or the data stream in the PDU session, wherein the first type of transmission comprises: the network side and the terminal side perform data copy type transmission on the data packet through multiple paths, and/or perform the first priority transmission of the data packets, the first priority transmission refers to that the transmitted data stream corresponds to a set of specific set of QoS parameters; wherein the first type of handover process comprises: before the air interface data radio bearer is handover from the first base station to the second base station, the second core network element completes the establishment of a first path with the first base station and the establishment of a second path with the second base station; after the air interface data radio bearer is handover from the first base station to the second base station, the second core network element releases the first path with the first base station.

301 station, the second core network element releases the first path with the first base station.

11 Claims, 9 Drawing Sheets

(30) Foreign Application Priority Data

Jun. 25, 2018 (CN) .......................... 201810664945.1
Aug. 14, 2018 (CN) ......................... 201810924672.X

(56) References Cited

U.S. PATENT DOCUMENTS

| | | | |
|---|---|---|---|
| 2017/0181044 A1 | 6/2017 | Wen et al. | |
| 2017/0294989 A1 | 10/2017 | Chen et al. | |
| 2020/0367046 A1* | 11/2020 | Son | .......................... H04W 8/26 |

FOREIGN PATENT DOCUMENTS

| | | |
|---|---|---|
| CN | 104935414 A | 9/2015 |
| CN | 105450367 A | 3/2016 |
| GB | 2555445 A | 5/2018 |
| WO | 2015/018653 A1 | 2/2015 |
| WO | 2016140757 A1 | 9/2016 |
| WO | 2019223267 A1 | 11/2019 |

OTHER PUBLICATIONS

Supplementary European Search Report issued in corresponding European Application No. 18 92 0018, dated Apr. 1, 2021, 14 pages.

Baseline CR for June version of RAN2 TS 38.300 (RAN3 part) covering agreements of RAN3#99Bis, 3GPP TSG-RAN WG3 Meeting #100, R3-182577, Busan, Korea, May 21-25, 2018, 16 pages.
"End marker handling in HO and DC", Agenda item: 10.5.6.1, Source: Samsung, KT Corp., 3GPP TSG-RAN WG3 #100 meeting, R3-183006, Busan, South Korea, May 21-25, 2018, 8 pages.
3rd Generation Partnership Project; Technical Specification Group Services and System Aspects; Policy and Charging Control Framework for the 5G System; Stage 2 (Release 15), 3GPP TS 23.503 V15.0.0 (Dec. 2017), 56 pages.
"Initial stage2 TP for MN/SN procedures for MR-DC with 5GC", Source: ZTE Corporation, Agenda item: 10.2.3, 3GPP TSG-RAN WG2 Meeting #98, R2-1705415, Hangzhou, China, May 15-19, 2017, 17 pages.
First Office action issued in corresponding India Application No. 202027049537, dated Dec. 8, 2021, 9 pages.
First Office action issued in corresponding European Application No. 18920018.1, dated Feb. 11, 2022, 11 pages.
"New KI and Alternative architecture framework for ATSSS", Agenda Item: 6.12, Source: Huawei, HiSilicon, SA WG2 Meeting #125 S2-180986, Jan. 22-26, 2018, Gothenburg, SE, 5 pages.
"Updating 6.2 Solution 2 to support a Multi-Access PDU Session with a single PDU session Id", Agenda Item: 6.8, Source: ETRI, SA WG2 Meeting #127 S2-183690, Apr. 16-20, 2018, Sanya, China, 10 pages.
"3rd Generation Partnership Project; Technical Specification Group Services and System Aspects; Procedures for the 5G System", Stage 2 (Release 15), 3GPP TS 23.502 V15.1.0 (Mar. 2018), http://www.3gpp.org, 285 pages.
"End marker handling in HO and DC", Source: Samsung, KT Corp., Agenda Item: 10.5.6.1, 3GPP TSG-RAN WG3 #99bis meeting, R3-181886, Sanya, China, Apr. 16-20, 2018, 5 pages.

* cited by examiner performing a first type transmission and/or a first type handover process on the PDU session and/or the data stream in the PDU session, wherein the first type of transmission comprises: the network side and the terminal side perform data copy type transmission on the data packet through multiple paths, and/or perform the first priority transmission of the data packets, the first priority transmission refers to that the transmitted data stream corresponds to a set of specific set of QoS parameters; wherein the first type of handover process comprises: before the air interface data radio bearer is handover from the first base station to the second base station, the second core network element completes the establishment of a first path with the first base station and the establishment of a second path with the second base station; after the air interface data radio bearer is handover from the first base station to the second base station, the second core network element releases the first path with the first base station. — 301

Fig.3

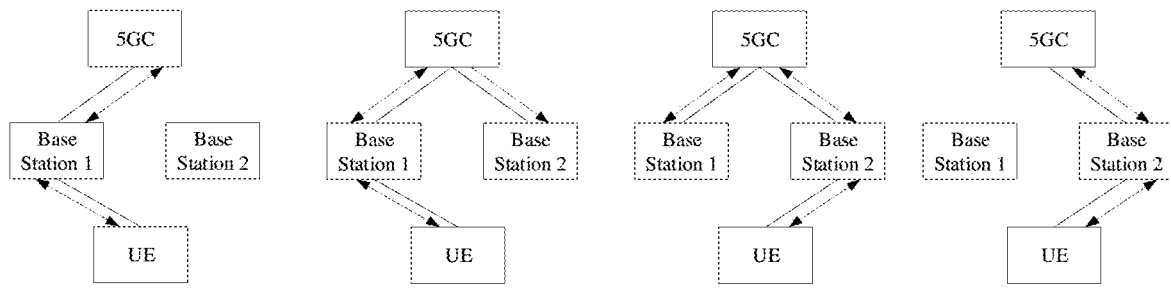

Fig.4 (a)

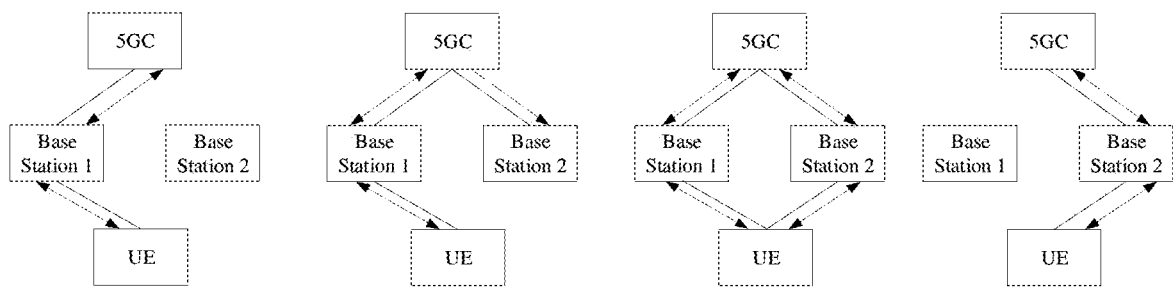

Fig.4 (b)

SESSION PROCESSING METHOD AND DEVICE, COMPUTER STORAGE MEDIUM

CROSS-REFERENCE TO RELATED APPLICATIONS

This application is a continuation application of International Application No. PCT/CN2018/116549, filed on Nov. 20, 2018, which claims the benefit of priorities to Chinese Applications No. 201810491348.3, filed on May 21, 2018, Chinese Applications No. 201810621962.7, filed on Jun. 15, 2018, Chinese Applications No. 201810664945.1, filed on Jun. 25, 2018, and Chinese Applications No. 201810924672.X, filed on Aug. 14, 2018, all of which are incorporated by reference in their entireties.

BACKGROUND

The present disclosure relates to the field of wireless communication technologies, and in particular, to a session processing method and device, and a computer storage medium.

At present, the cross-base station handover in the same core network will cause a short interruption in data transmission.

SUMMARY

Embodiments of the present disclosure provide a session processing method and device, and a computer storage medium.

The session processing method provided in the embodiment of the present disclosure includes performing a first type transmission and/or a first type handover process on a Protocol Data Unit (PDU) session and/or a data stream in the PDU session. The first type of transmission includes performing a data copy type transmission of a data packet through multiple paths between a network side and a terminal side, and/or performing a first priority transmission of the data packet, the first priority transmission refers to that transmitted data stream corresponds to a set of specific Quality of Service (QoS) parameters.

The first type of handover process includes before an air interface data radio bearer is handover from a first base station to a second base station, establishing, by an second core network element, a first path with the first base station and a second path with the second base station; and after the air interface data radio bearer is handover from the first base station to the second base station, releasing, by the second core network element, the first path with the first base station.

The session processing device provided in the embodiment of the present disclosure includes a control unit, configured to perform a first type transmission and/or a first type handover process on a PDU session and/or a data stream in the PDU session, wherein the first type transmission includes: performing data copy type transmission of a data packet through multiple paths between a network side and a terminal side, and/or performing a first priority transmission of the data packet, the first priority transmission refers to that transmitted data stream corresponds to a set of specific QoS parameters.

The first type of handover process includes before an air interface data radio bearer is handover from a first base station to a second base station, establishing, by a second core network element, a first path with the first base station and a second path with the second base station; and after the air interface data radio bearer is handover from the first base station to the second base station, releasing, by the second core network element, the first path with the first base station.

The computer storage medium provided in the embodiments of the present disclosure stores computer-executable instructions, and wherein when computer-executable instructions are executed by a processor, steps of the foregoing session processing method are implemented.

BRIEF DESCRIPTION OF THE DRAWINGS

The drawings described here are used to provide a further understanding of the present disclosure and constitute a part of the present disclosure. The schematic embodiments of the present disclosure and the description thereof are used to explain the present disclosure and do not constitute an improper limitation on the present disclosure. In the drawings:

FIG. 2 (b) is a flowchart of a handover execution based on the N2 interface;

FIG. 3 is a schematic flowchart of a session processing method according to an embodiment of the present disclosure;

FIG. 4 (a) is a first schematic diagram of a network architecture for a cross-base station handover according to an embodiment of the present disclosure;

FIG. 4 (b) is a second schematic diagram of a network architecture for a cross-base station handover according to an embodiment of the present disclosure;

DETAILED DESCRIPTION

In order to understand the features and technical contents of the embodiments of the present disclosure in more detail, the implementation of the embodiments of the present disclosure will be described in detail with reference to the accompanying drawings. The attached drawings are for reference only and are not intended to limit the embodiments of the present disclosure.

Figure 1:
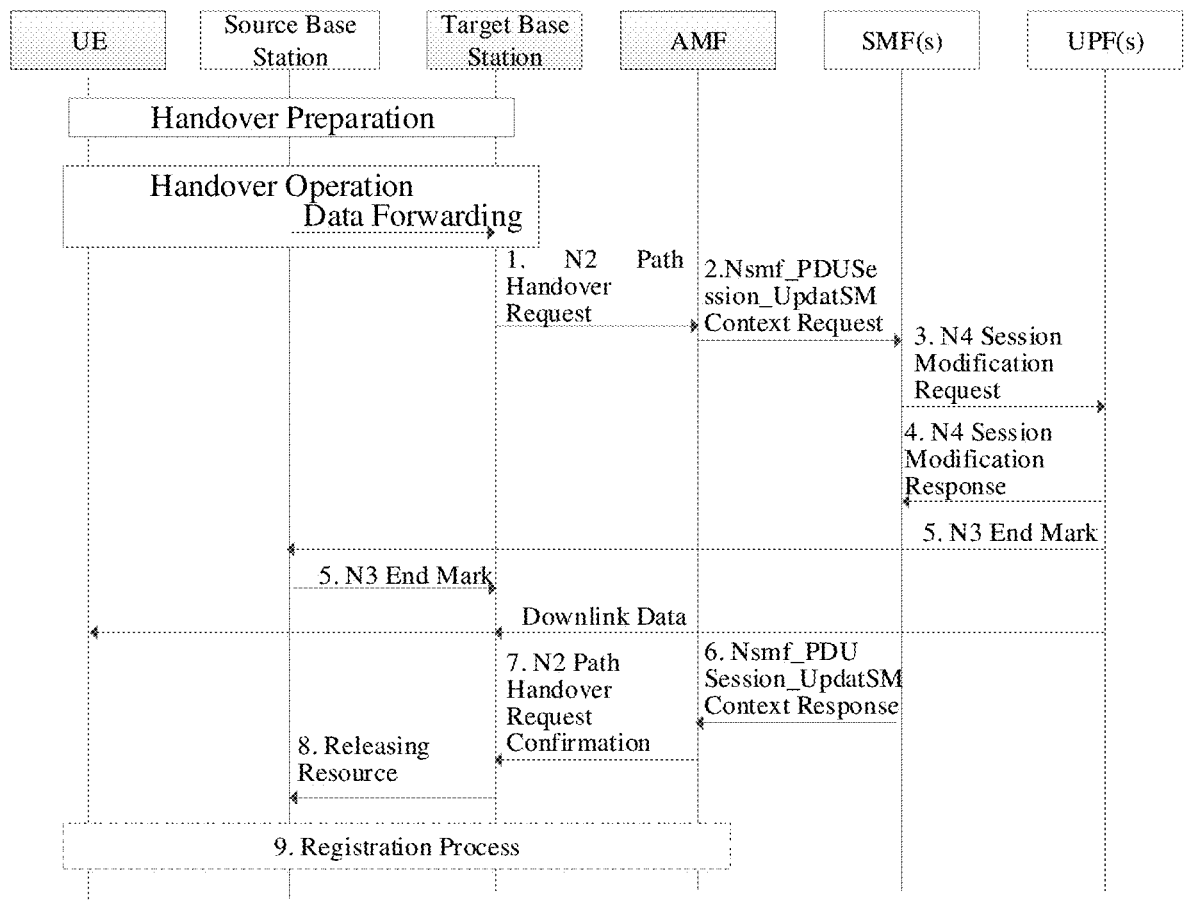
FIG. 1 is a flowchart of a handover based on an Xn interface.
Figure 2:
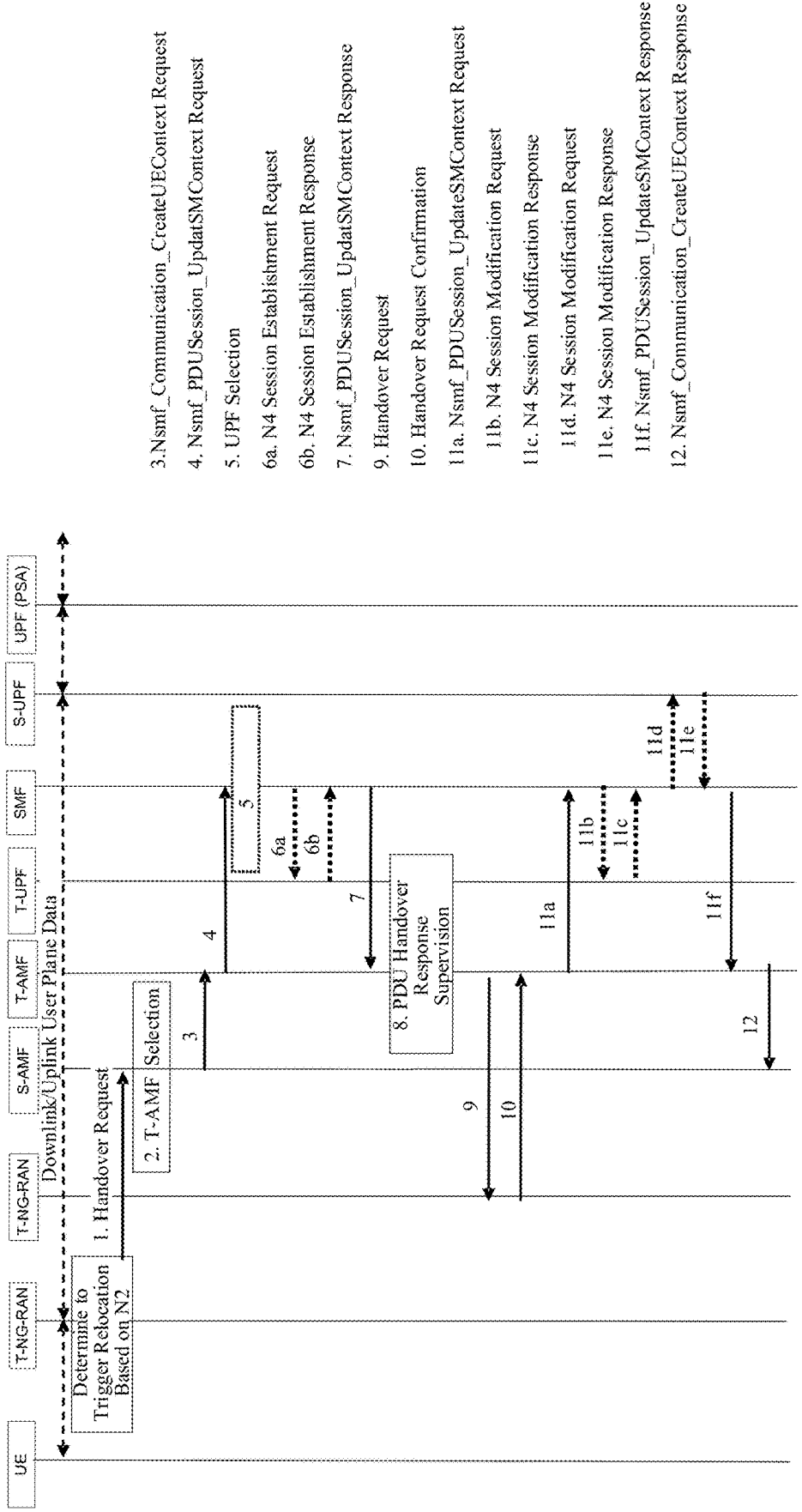
FIG. 2 (a) is a flowchart of a handover preparation based on an N2 interface.
Figure 2:
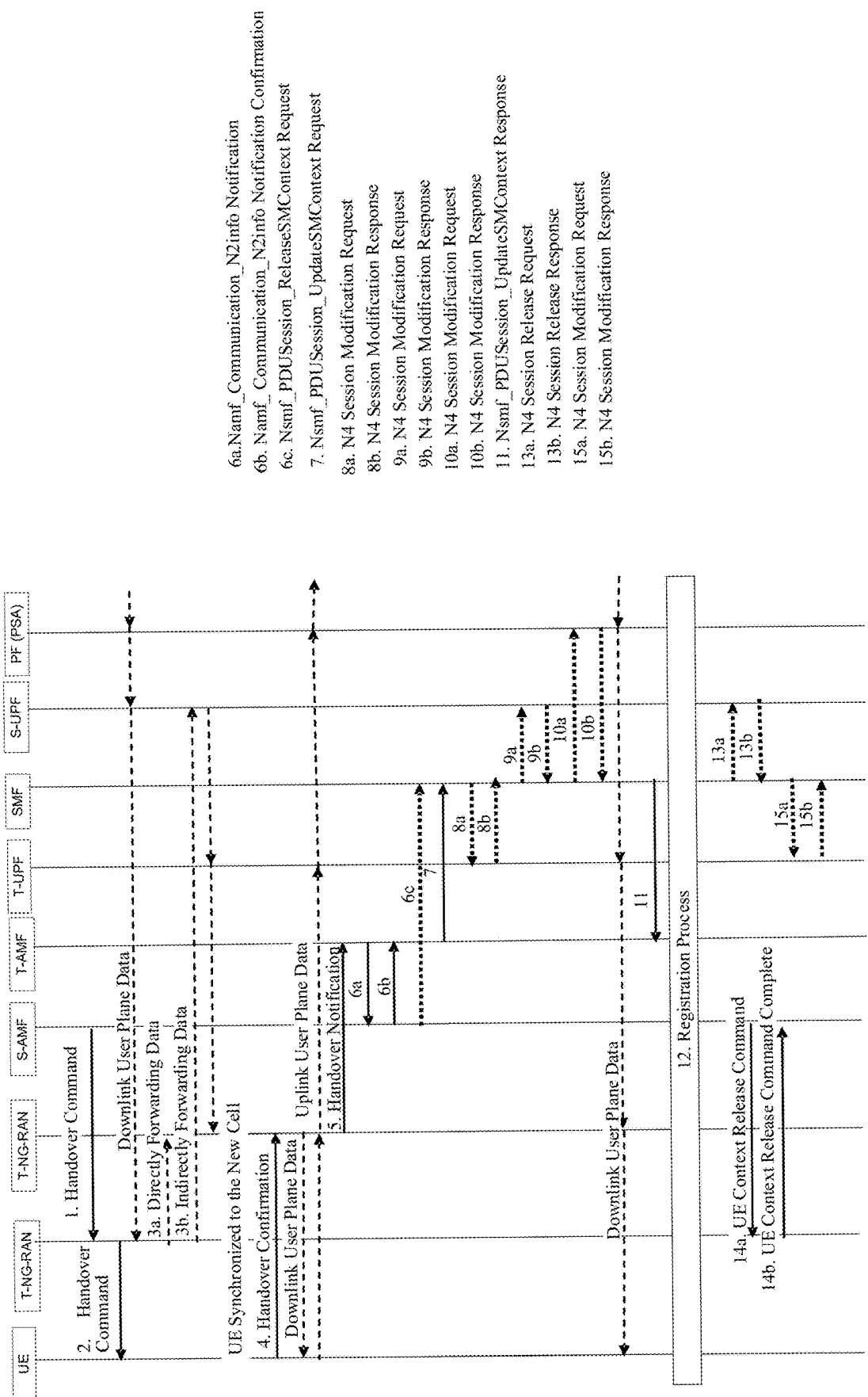

A current handover process is shown in FIG. 1, FIG. 2 (a), and FIG. 2 (b), wherein FIG. 1 is a handover process based on an Xn interface, FIG. 2 (a) is a handover preparation process based on an N2 interface, and FIG. 2 (b) is a handover execution process based on the N2 interface. During the cross-base station handover, the main reasons for a temporary interruption of data transmission are that: a terminal is always in a Single Radio state, an old session (the session on the source base station side) must be disconnected before a new session (the session on the target base station side) is established, and delays and interruptions caused by a single-pass handover on the air interface side cannot be avoided.

FIG. 3 is a schematic flowchart of a session processing method according to an embodiment of the present disclosure. As shown in FIG. 3, the session processing method includes the following steps:

Step 301: performing a first type transmission and/or a first type handover process on a Protocol Data Unit (PDU) session and/or a data stream in the PDU session, wherein the first type of transmission includes: a network side and a terminal side perform a data copy type transmission on a data packet through multiple paths, and/or perform a first priority transmission on the data packet, the first priority transmission refers to that the transmitted data stream corresponds to a set of specific Quality of Service (QoS) parameters; wherein the first type of handover process includes: before an air interface data radio bearer is handover from a first base station to a second base station, an second core network element completes an establishment of a first path with the first base station and an establishment of a second path with the second base station; after the air interface data radio bearer is handover from the first base station to the second base station, the second core network element releases the first path with the first base station.

In an implementation, a first core network element receives a session establishment or modification request message carrying the PDU session identification information and/or the data stream identification information and/or slice selection assistance information SNSSAI and/or DNN information, and determines whether to perform the first type transmission and/or the first type handover process on the PDU session and/or the data stream in the PDU session, based on the information in the session establishment or modification request message. Further, the first core network element determines whether to perform the first type transmission and/or the first type handover process on the PDU session and/or the data stream in the PDU session based on the SNSSAI and/or the DNN and/or a first policy in the session establishment or modification request message;

wherein, the first policy includes at least a set of Policy Control and Charging (PCC) policy information and/or correspondence between the S-NSSAI and/or the DNN and first indication information, and the first indication information is used to indicate whether to perform the first type transmission and/or the first type handover process.

In the embodiment of the present disclosure, the session establishment or modification request message includes two pieces of PDU session identification information and/or data stream identification information;

The first core network element determines whether to perform the first type of transmission and/or the first type handover process on all or part of the data stream of the two PDU sessions, based on the two pieces of PDU session identification information and/or the data stream identification information.

In the embodiment of the present disclosure, the terminal initiates session establishment or update requests twice, wherein a first session establishment or modification request message carries a first session identifier, and a second session establishment or modification request message carries the first session identifier and a second session identifier; and/or, the first session establishment or modification request message carries a first data stream identifier, and the second session establishment or modification request message carries the first data stream identifier and a second data stream identifier.

In the embodiment of the present disclosure, the PDU session identifier and/or the data stream identifier carry first information, and the first information is used to indicate execution of the first type of transmission and/or the first type of handover process.

In the embodiment of the present disclosure, the first core network element refers to a Session Management Function (SMF), the second core network element refers to a User Plane Function (UPF), and a third core network element refers to receiving core access and mobility management function (AMF). The first base station refers to the source base station of the serving terminal, and the second base station refers to the target base station of the serving terminal.

In the embodiment of the present disclosure, the first type of handover process is introduced, and the first type of handover process is also referred to as a fast handover. The fast handover can be applied in the following two scenarios.

Scenario 1: a fast handover implemented based on the N2 interface without changing the core network in the single-pass mode or the dual-pass mode of the terminal.

In this scenario, after the third core network element receives the handover request sent by the first base station, the first core network element receives the session establishment or modification request message sent by the third core network element. The handover request message carries the PDU session identification information and/or the data stream identification information, and the session establishment or modification request message carries the PDU session identification information and/or the data stream identification information; wherein, the PDU session identification information includes the PDU session identification information on the first base station side and/or identification information of at least one second PDU session, the at least one second PDU session and the PDU on the first base station side have a first association relationship.

Scenario 2: a fast handover implemented based on the Xn interface without changing the core network in the single-pass mode or the dual-pass mode of the terminal.

In this scenario, while performing an air interface handover process by the first base station and the second base station, the first core network element receives a session establishment or modification request message sent by the first base station and/or the second base station. The handover request message carries the PDU session identification information and/or the data stream identification information, and the session establishment or modification request message carries the PDU session identification information and/or the data stream identification information.

The PDU session identification information includes the PDU session identification information on the first base station side and/or at least one second PDU session identification information, the at least one second PDU session and the PDU on the first base station side have a first association relationship.

Further, the performing the air interface handover by the first base station and the second base station includes the first base station sending a handover request message to the second base station; the second base station sending a handover reply message to the first base station; the first base station and the second base station completing the air interface handover for the terminal side.

After the second base station sends the handover the reply message to the first base station, the first core network element receives the session establishment or modification request message sent by the second base station; and/or after the first base station and the second base station completes the air interface handover for the terminal side, the first core network element receives the session establishment or modification request message sent by the first base station.

In the embodiments of the present disclosure, the first type of transmission is also referred to as low-latency and/or high-reliability transmission. The low-latency and/or high-reliability transmission is that a network side and a UE side perform data copy type transmission on a specific data packet through multiple paths and/or perform high-priority transmission on a transmission queue of the related data packet. Here, the high-priority transmission refers to that the related data stream corresponds to a set of specific QoS parameters.

In the embodiment of the present disclosure, a process of the air interface data radio bearer is handover from the first base station to the second base station includes:
the single-pass mode of the terminal: when the terminal establishes the air interface data radio bearer with the first base station, the air interface data radio bearer is directly handover from the first base station to the second base station; or, the dual-pass mode of the terminal: when the terminal establishes the air interface data radio bearer with the first base station, the terminal simultaneously established the air interface data radio bearer with the second base station, and then released air interface data radio bearer with the first base station side.

Here, for the above scenario 1: the second core network element releases a first path with the first base station, includes: the terminal sends a request message to the first core network element to release the PDU session on the first base station side, and the first core network element triggering the second core network element to release the first base station side; or the second core network element triggering the second core network element to release the PDU session on the first base station side.

Here, for the above scenario 2: the second core network element releases a first path with the first base station, includes: the second base station sending a path handover request message to a third core network element; the third core network element sending a session modification request message to the first core network element, and the first core network element triggering the second core network element to release the PDU session on the first base station side.

In the above solution, the PDU session identification information and/or the data stream identification information is used to indicate whether to perform the first type of handover.

In the first type of handover process (also referred to as a fast handover process) in the embodiment of the present disclosure, referring to FIG. 4 (a) and FIG. 4 (b), before completing the handover of the air interface data radio bearer (air interface DRB) from the source base station (base station 1) to the target base station (base station 2), a core network side (5GC) has completed the data plane UPF link establishment with base station 1 and base station 2, and sent downlink data streams to base station 1 and base station 2 simultaneously. In FIG. 4 (a) and FIG. 4 (b), the solid line is the data plane, and the dashed arrow is the data transmission direction (uplink, downlink, or uplink and downlink).

As shown in FIG. 4 (a), during the fast handover process, the terminal is in the single-pass mode throughout, and the interruption time is limited to the air interface handover process, thereby avoid extra delay and interruption caused by data link establishment/modification of the core network side.

As shown in FIG. 4 (b), during the fast handover process, the terminal is in the dual-pass mode and the "establish before cut" solution is adopted for the air interface handover process, that is, the air interface data radio bearer is firstly established on the base station 2 side, and then the terminal's air interface data radio bearer is handover from the base station 1 to the base station 2. This air interface handover process is completely uninterrupted and without delay, and meanwhile, it avoids additional delays and interruptions caused by the data link establishment/modification of the core network side.

In the embodiment of the present disclosure, a first policy (also referred to as a "fast handover" policy) is introduced, and the first core network element determines whether to perform the first type transmission and/or the first type handover process on the PDU session and/or the data stream in the PDU session based on the PDU session identification information and the first policy. Here, the first policy includes at least one set of the PCC policy information and/or correspondence between S-NSSAI and/or DNN and first indication information, where the first indication information is used to indicate whether to perform the first type of transmission and/or the first type of handover process. In one example, the first policy is shown in Table 1:

TABLE 1

| Identification Information of S-NSSAI and/or DNN | First Indication Information | |
|---|---|---|
| S-NSSAI-1, DNN-1 | Perform Fast Handover | No First Type Of Transmission |
| S-NSSAI-2, DNN-1 | No Fast Handover | Perform First Type Of Transmission |
| S-NSSAI-2, DNN-3 | Perform Fast Handover | Perform First Type Of Transmission |
| S-NSSAI-2, DNN-3 | Perform Fast Handover | No First Type Of Transmission |
| Others | No Fast Handover | No First Type Of Transmission |

Based on this, the first core network element determines the first indication information corresponding to the S-NSSAI and/or DNN based on the SNSSAI and/or DNN in the session establishment or modification request message and the first policy; and determines whether to perform the first type of transmission and/or the first type of handover process on the PDU session and/or the data stream in the PDU session based on the first indication information.

Further, the first core network element stores a correspondence between the PDU session identification information and/or data stream identification information and whether to perform the first type of transmission and/or the first type of handover process and subsequently, in a specific implementation process of handover, determining, by the first core network element upon each time the first core network element (i.e., SMF) receiving the handover request, whether to perform the first type of transmission and/or the first type of handover process on the PDU session and/or the data stream in the PDU session, based on the correspondence between the PDU session identification information and/or data stream identification information and whether to perform the first type of transmission and/or the first type of handover process stored locally.

Further, the first core network element notifies the base station of performing the first type of transmission and/or the first type of handover process on the PDU session and/or the data stream in the PDU session. In this way, during the first type of transmission, the base station performs processing on the air interface for the data packet corresponding to the session and/or the data stream, such as optimizing retransmission mechanism and timer time adjustment; during the first type of handover process, the base station does not perform data forwarding processing on the session and/or the data stream.

In the embodiment of the present disclosure, the first policy is configured in at least one of the following network elements: a contract information database (Unified Data Management, UDM), a policy control network element (PCF), and the first core network element. Specifically, the first policy may be configured in the UDM and/or PCF on the network side based on user granularity or may be statically configured in the SMF. Each time a PDU session is established/modified, the SMF decides whether to perform fast handover on the current PDU session and/or part of the data stream.

Further, the first core network element determines whether to perform the first type of transmission and/or the first type of handover process on the PDU session and/or the data stream in the PDU session, based on the information in the session establishment or modification request message and/or the first policy and/or the QoS parameters of the data stream in the PDU session. Specifically, in addition to the first strategy, the basis for the SMF to decide whether to perform the first type of handover may consider the QoS parameters of the data stream, such as performing fast handover for part of a specific data stream with 5QI value. During the PDU session establishment/modification process, after the SMF decides whether to perform the "fast handover" on the PDU session or part of the data stream, the association relationship between the PDU session ID and the fast handover strategy is stored locally, and it can be determined whether to perform the fast handover according to the handover PDU session ID at each handover.

In the embodiment of the present disclosure, during the first type of handover, 1) the same IP address is assigned to the first path with the first base station side and the second path with the second base station side, and the PDU session on the first base station side and the PDU session on the second base station side correspond to the same data stream and a QoS policy. Or, 2) different IP addresses are assigned to the first path with the first base station side and the second path with the second base station side, and the PDU session on the first base station side and the PDU session on the second base station side correspond to the same data stream and QoS policy.

For data transmission, during the first type of handover process, after the second core network element completes the establishment of the first path with the first base station and the establishment of the second path with the second base station, same data is sent to the first base station and the second base station simultaneously in a downlink direction, and/or, the same data sent by the first base station and the second base station is received in the uplink direction; in one example, the first path and the second path belong to the same PDU session. After the second base station receives the downlink data sent by the second core network element through the second path, and before the air interface data radio bearer is handover from the first base station to the second base station, or before the air interface data radio bearer is established on the second base station side, the downlink data is buffered or discarded. After the air interface data radio bearer is handover from the first base station to the second base station or after the air interface data radio bearer is established on the second base station side, the second base station starts sending downlink data to the terminal. If the second base station buffers the downlink data from the second core network element, the buffered downlink data from the second core network element is also sent to the terminal.

In the embodiment of the present disclosure, the copy type transmission refers to transmitting the same data on two different paths. Further, the transmitting the same data on two different paths includes: on the core network side, the same second core network element transmits the same data on two different paths; or, two different second core network elements transmit the same data on two different paths; on the access network side, two different data bearers of the same base station transmit the same data; or, two different data bearers of two different base stations transmit the same data. Further, the IP addresses of the different paths are different or the same, and the data streams and the QoS policies of the different paths are different or the same.

In the above solution, data bearers refer to connections and/or links, and different data bearers refer to different connections and/or links on the user plane.

In one example, if the same second core network element transmits the same data on two different paths on the core network side and two different data bearers on two different base stations transmit the same data on the access network side, the second core network element sends the same downlink data packet to the first base station and the second base station simultaneously.

In the above solution, data stream identifiers of the data transmitted on different paths are the same. Or, the data stream identifiers of the data transmitted on different paths are different.

In the embodiments of the present disclosure, how to ensure that the same downlink data is received in an orderly manner on the terminal side or that the uplink data is received in an orderly manner on the second core network element side can be achieved by 1) a first sequence number is added to the same downlink data packet sent by the second core network element to the first base station and the second base station simultaneously; for the downlink data transmission, the first base station notifies the second base station of a correspondence between a first sequence number of one layer in a core network protocol of a downlink data packet and a second sequence number of one layer in an air interface protocol, the second base station parses the received data packet and obtains the first sequence number of the layer in the core network protocol, and sends the second sequence number corresponding to the first sequence number to the terminal based on the correspondence between the first sequence number and the second sequence number, and the terminal reorders the data packet based on the second sequence number.

Here, if the first sequence number in the data packet received by the second base station in the downlink direction is different from the first sequence number in the correspondence, the second base station calculates the second sequence number corresponding to the first sequence number in the data packet based on the correspondence.

In a specific implementation, if the SN value of the GTP-U layer received by the second base station in the downlink is different from the SN value of the GTP-U layer in the correspondence from the first base station, (for example, during a period when the second base station receives the correspondence and the downlink data packet, some data packets are transmitted at the first base station, which causes the SN value of the GTP-U layer received by the second base station in the downlink is different from the SN value of the GTP-U layer in the correspondence), the second base station needs to derive the correspondence between the SN value of the GTP-U layer of the data packet and the SN of the air interface protocol layer by itself. For example: for the downlink direction, the GTP-U SN of the data packet received by the first base station equals 100, the PDCP SN corresponding to the GTP-U SN equals 125, and the GTP-U SN of the second base station received the downlink data packet equals 145, so that the second base station can derive the PDCP SN of the downlink data packet equals: 125 (145−100)=160.

In the above solution, the correspondence is transparently transmitted by the first base station to the second base station through the core network element, or the correspondence is transmitted to the second base station by the first base station through a direct interface between the base stations.

Figure 5:
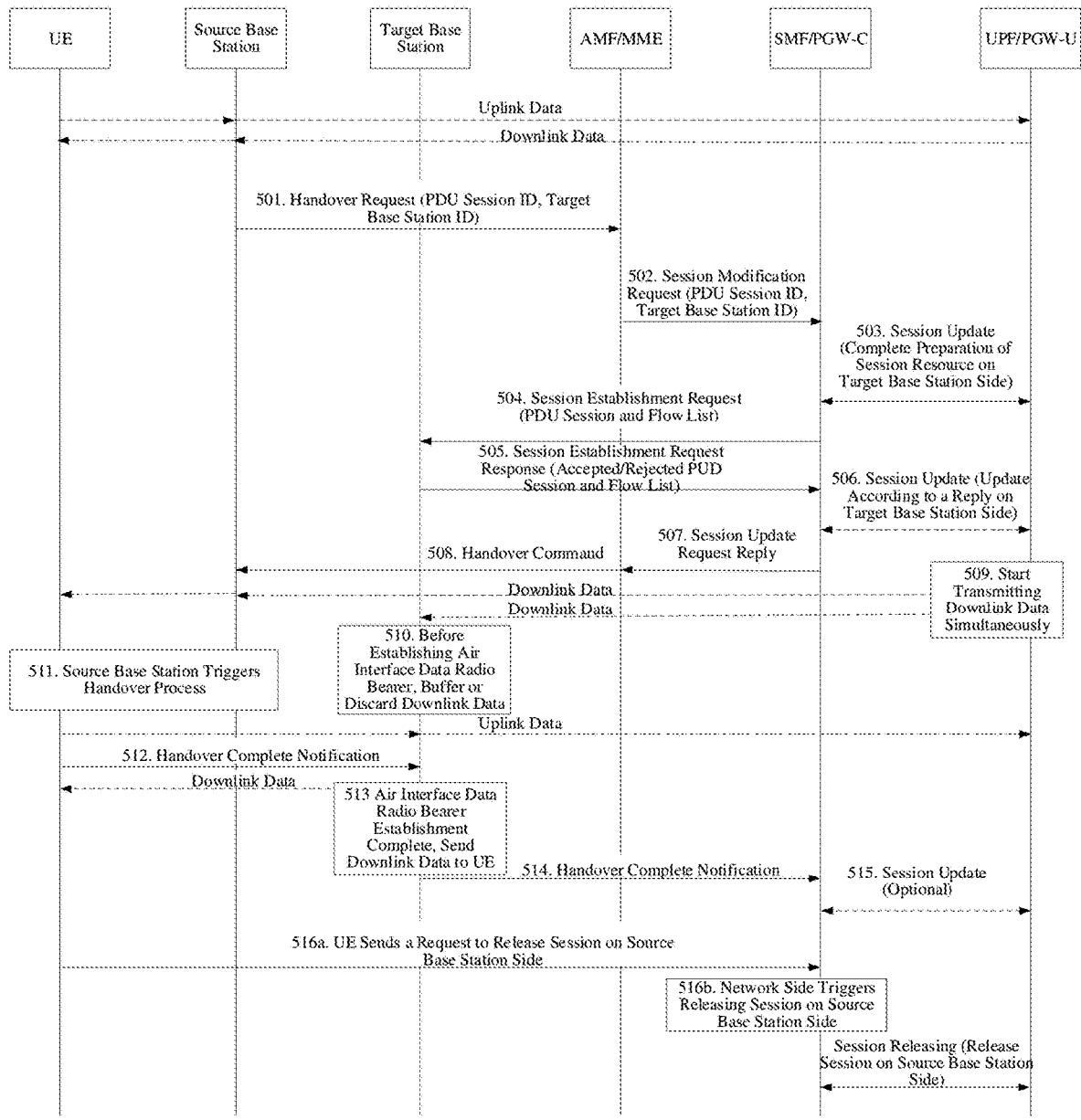
FIG. 5 is a schematic flowchart of a fast handover implemented based on the N2 interface without changing a core network in a single-pass mode or a dual-pass mode of a terminal according to an embodiment of the present disclosure.
Figure 6:
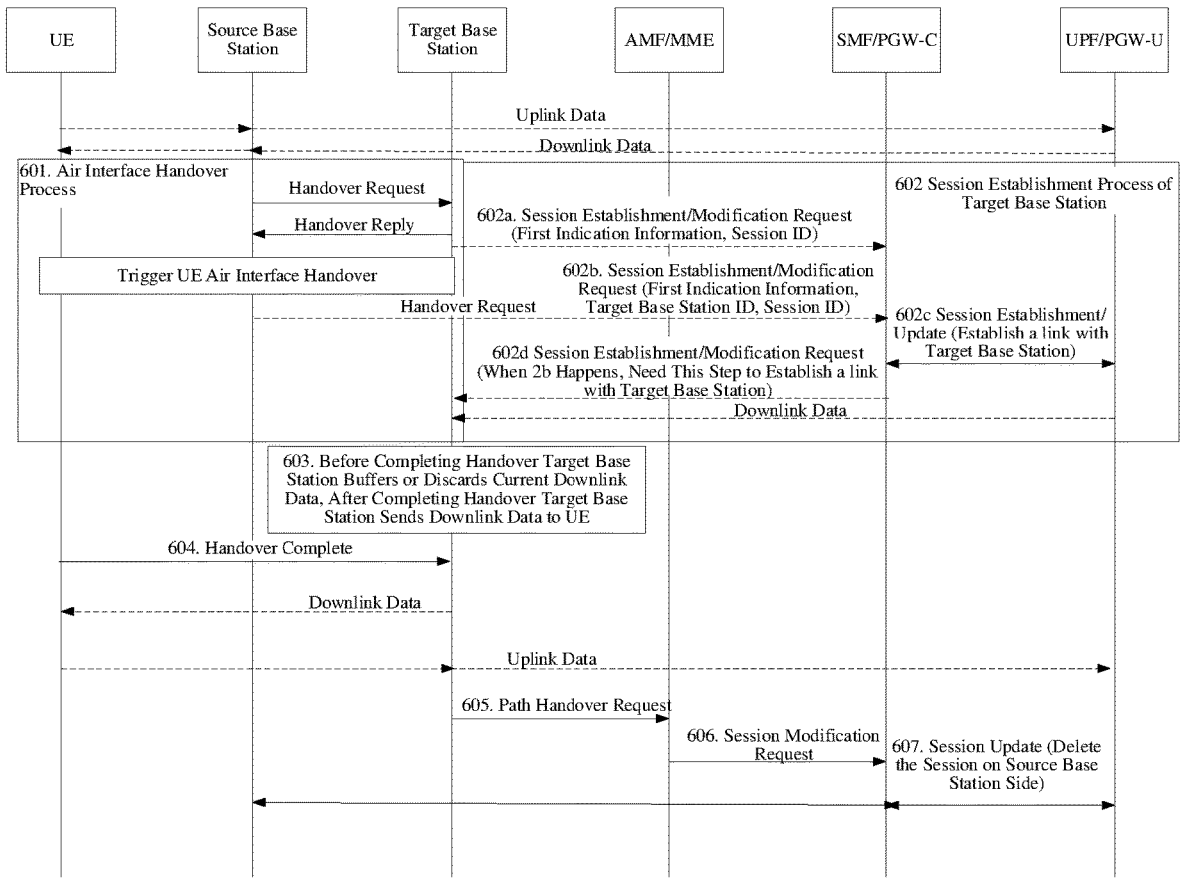
FIG. 6 is a flowchart of a fast handover implemented based on the Xn interface without changing a core network in a single-pass mode or a dual-pass mode of a terminal according to an embodiment of the present disclosure.

In a specific implementation, in a handover scenario, the correspondence may be added to a container of a handover request message in a handover preparation stage shown in FIG. 6, or a new parameter may be added in the handover request message in a handover preparation stage shown in FIG. 5, to indicate the correspondence.

The terminal adds a second sequence number to the same uplink data packets sent by the first base station and the second base station simultaneously; wherein, for the uplink data transmission, the first base station notifies the second base station of the correspondence between the second sequence number of one layer in the air interface protocol of the uplink data packet and the first sequence number of one layer in the core network protocol, the second base station parses the received data packet and obtains the second sequence number of one layer in the core network protocol, and sends the first sequence number corresponding to the second sequence number to the terminal based on the correspondence between the second sequence number and the first sequence number. The second core network element reorders the data packets based on the first sequence number.

Here, if the second sequence number in the data packet received by the second base station in the uplink direction is different from the second sequence number in the correspondence, the second base station calculates the first sequence number corresponding to the second sequence number in the data packet based on the correspondence.

In a specific implementation, if the SN value of the air interface layer (such as the PDCP layer) received by the second base station in the uplink is different from the SN value of the air interface layer in the correspondence from the first base station, the second base station needs to derive the correspondence between the SN value of the air interface layer of the data packet and the SN of the GTP-U layer by itself. For example: for the uplink direction, the PDCP SN of the data packet received by the first base station equals 125, the GTP-U SN corresponding to the PDCP SN equals 100, and the PDCP SN of the second base station received the uplink data packet equals 160, so that the second base station can derive the GTP-U SN of the uplink data packet equals: 160+(100−125)=145.

In the above solution, the correspondence is transparently transmitted by the first base station to the second base station through a core network element, or the correspondence is transmitted to the second base station by the first base station through a direct interface between the base stations.

In a specific implementation, in a handover scenario, the correspondence may be added to a container of a handover request message in a handover preparation stage shown in FIG. 6, or a new parameter may be added in the handover request message in a handover preparation stage shown in FIG. 5, to indicate the correspondence.

Here, one layer of the air interface protocol includes a PDCP layer and/or a Service Data Adaptation Protocol (SDAP) layer, and one layer of the core network protocol includes a GPRS Tunneling Protocol (GTP) layer. When a second sequence number is added to the PDCP layer, the air interface data radio bearer corresponding to the data stream redundantly transmitted by the user plane of the core network is not used for transmission of other data streams. In this way, the correspondence between the PDCP SN and the GTP-U SN can be prevented from being disturbed.

Further, the first base station notifies the second base station of the correspondence between the first sequence number and the second sequence number through an Xn interface; or, the first base station sends the correspondence between the first sequence number and the second sequence number to the core network through the N2 interface, and the core network sends the correspondence between the first sequence number and the second sequence number to the second base station; or, the first base station notifies the second base station of the correspondence between the first sequence number and the second sequence number through an air interface message.

Here, after receiving the downlink data packet, the first base station parses the data packet to obtain the first sequence number, and reorders the data packet by the second sequence number of one layer in the air interface protocol, and determines the correspondence between the first sequence number and the second sequence number of the data packet.

Or, 2) a first sequence number is added to the same downlink data packet sent by the second core network element to the first base station and the second base station simultaneously; for the downlink data transmission, after the first base station and/or the second base station receive the downlink data packet, the first sequence number in the downlink data packet is transmitted to the terminal, so that the terminal parses the downlink data packet and obtains the first sequence number, and reorders the downlink data packet based on the first sequence number; the first sequence number is added to the same uplink data packets sent by the terminal to the first base station and the second base station simultaneously; for the uplink data transmission, after the first base station and/or the second base station receive the uplink data packet, the first sequence number in the uplink data packet is transmitted to the second core network element, so that the second core network element parses the uplink data packet and obtains the first sequence number, and reorders the uplink data packet based on the first sequence number.

Here, the first sequence number in the data packet is included in a protocol layer above the PDCP layer, the SDAP layer, or the GTP layer.

The technical solutions of the embodiments of the present disclosure are described in further detail in the following two scenarios of fast handover.

FIG. 5 is a schematic flowchart of a fast handover implemented based on an N2 interface without changing a core network in a single-pass or dual-pass mode of the terminal according to an embodiment of the present disclosure. As shown in FIG. 5, the process includes the following steps.

Step 501: A source base station sends a handover request message to AMF/MME.

Here, the handover request message carries a PDU session ID and a target base station ID. Further, the PDU session ID carried in the handover request message is same as a PDU session ID on the source base station side; or the PDU session ID different from the PDU session ID on the source base station side is carried in the handover request message, but the association relationship of the PDU session ID (that is, the current session ID) must be specified.

Step 502: The AMF/MME sends a session modification request message to SMF/PGW-C.

Here, the session modification request message carries a PDU session ID and a target base station ID.

Step 503: The session update between the UPF/PGW-U and the SMF/PGW-C is performed to complete the preparation of the session resources on the target base station side.

Here, during the establishment/update process of the core network, 1) for sessions requiring "fast handover," the same IP address is assigned to the link between the target base station and the source base station, that is, the two links are used as the same PDU session, and session 1 of the source base station and session 2 of the target base station can run the same flow and execute the same QoS policy; or, 2) for sessions requiring "fast handover," two IP addresses are assigned to the link between the target base station and the source base station, but session 1 of the source base station and session 2 of the target base station can run the same flow and execute QoS policy.

Step 504: The SMF/PGW-C sends a session establishment request message to the target base station.

Here, the session establishment request carries a PDU session ID and a Flow list.

Step 505: The target base station sends a session establishment request reply message to the SMF/PGW-C.

Here, the session establishment request reply message carries the accepted/rejected PDU session ID and Flow list.

Step 506: The session update is performed between the SMF/PGW-C and the UPF/PGW-U, and the session update is performed according to the reply from the target base station side.

Step 507: The SMF/PGW-C sends a session update request reply message to the AMF/MME.

Step 508: The AMF/MME sends a handover command to the source base station.

Step 509: The UPF/PGW-U transmits downlink data to the source base station and the target base station simultaneously.

Here, after the UPF/PGW-U completes step 505, it can directly start transmitting data to the source base station and the target base station. Here, the two base stations can replicate the same data transmission (can be performed in parallel with step 508).

Step 510: The target base station buffers or discards the downlink data before establishing the air interface data radio bearer.

After the target base station receives the downlink data, since the DRB connection with the UE has not yet been established, the data packet may be buffered or discarded until the DRB is established after the handover is completed in Step 511.

Step 511: The source base station triggers a handover procedure.

Step 512: The UE sends a handover completion notification message to the target base station.

Step 513: The air interface data radio bearer is established on the target base station side, and the downlink data is sent to the UE.

Here, after the target base station receives the handover completion notification message or after the target base station has established the air interface data radio bearer, it starts to send downlink data to the UE, and if it has previously buffered the downlink data from the UPF, it sends it to the UE.

Step 514: The target base station sends a handover completion notification message to the SMF/PGW-C.

Step 515: Session update is performed between the SMF/PGW-C and UPF/PGW-U (optional).

Step 516a: The UE sends a session request message of the source base station side to the SMF/PGW-C.

Step 516b: The SMF/PGW-C side triggers the release of the session on the source base station side.

Here, releasing the session on the source base station side may be implemented by step 516a and/or step 516b.

FIG. 6 is a flowchart of a fast handover based on an Xn interface without changing a core network in a single-pass or dual-pass mode of a terminal according to an embodiment of the present disclosure. As shown in FIG. 6, the process includes the following steps:

Step 601: An air interface handover process is performed between a source base station and a target base station.

Specifically, the source base station sends a handover request message to the target base station; the target base station sends a handover reply message to the source base station; and a UE air interface handover is triggered between the source base station and the target base station.

Step 602: A core network side performs a session establishment process on the target base station side.

This step specifically includes:

602a: The target base station sends a session establishment/modification request message to SMF/PGW-C.

Here, the session establishment/modification request message carries first indication information and a PDU session ID to be established.

Wherein, the first indication information is used for whether the PDU session corresponding to the PDU session ID needs to perform fast handover.

602b: The source base station sends a session establishment/modification request message (that is, a handover request message) to the SMF/PGW-C.

Here, the session establishment/modification request message carries the first indication information, the PDU session ID to be established, and a target base station ID.

Wherein, the first indication information is used for whether the PDU session corresponding to the PDU session ID needs to perform fast handover.

602c: Session establishment/update is performed between the SMF/PGW-C and UPF/PGW-U, and the UPF/PGW-U establishes a link with the target base station side.

602d: The SMF/PGW-C sends a session establishment/modification request message to the target base station.

Here, when 602b is executed, 602d needs to be executed to complete the establishment of a link between the UPF/PGW-U and the target base station side.

Here, the session establishment process on the core network side is performed in parallel with the air interface handover process on the access network side. During the air interface handover process (after a certain step, such as after the handover reply message), the target base station or the source base station sends a session establishment/update request to the core network.

Here, during the establishment/update process of the core network, 1) for sessions requiring "fast handover," the same IP address is assigned to the link between the target base station and the source base station, that is, the two links are used as the same PDU session, and session 1 of the source base station and session 2 of the target base station can run the same flow and execute the same QoS policy; or, 2) for sessions requiring "fast handover," two IP addresses are assigned to the link between the target base station and the source base station, but session 1 of the source base station and session 2 of the target base station can run the same flow and execute QoS policy.

Step 603: The target base station buffers or discards the received downlink data before the air interface handover is completed, or the target base station establishes the air interface data radio bearer. After the air interface handover is completed or after the air interface data radio bearer is established on the target base station side, the downlink data is sent to a UE.

After the target base station receives the downlink data since a DRB connection with the UE has not yet been established, the data packet may be buffered or discarded until the DRB is established after the handover is completed in Step 604, and the target base station starts sending downlink data to the UE. If the downlink data from the UPF is buffered before, it is also sent to the UE.

Step 604: The UE sends a handover completion message to the target base station.

Step 605: The target base station sends a path handover request message to the AMF/MME.

Step 606: The AMF/MME sends a session modification request message to the SMF/PGW-C.

Step 607: The SMF/PGW-C triggers the UPF/PGW-U to perform a session update and deletes the PDU session on the source base station side.

Figure 9:
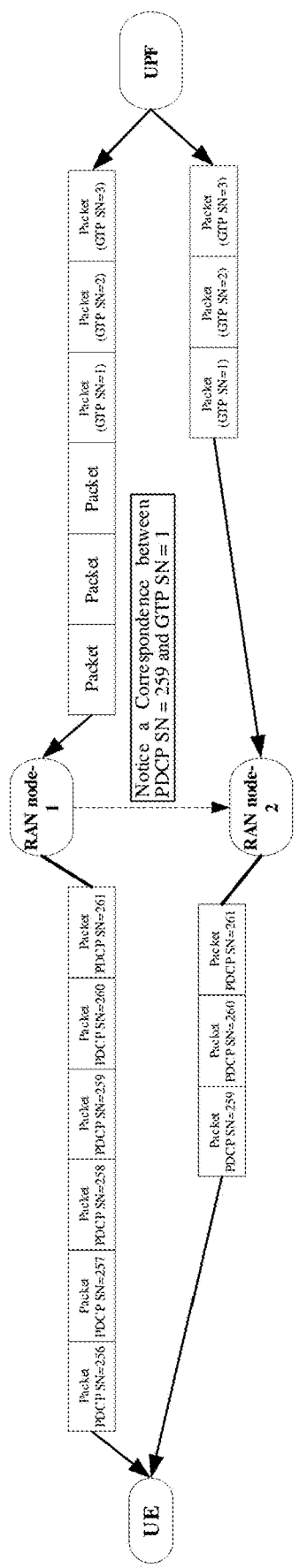
FIG. 9 is a first schematic diagram of reordering data packets according to an embodiment of the present disclosure.

In the processes shown in FIG. 5 and FIG. 6, the case where the UPF sends duplicate data to the source base station and the target base station is included. In order to ensure that the duplicate data can be correctly sorted on the UE side, a sequence number (SN) is added to the data packet, and the air interface is suitable for handover between the single-pass mode or the dual-pass mode. There are two methods: 1) The added SN is parsed on the RAN base station side, and then the duplicate data packets are reordered by the SN of the PDCP layer. Specifically, the data packet between the UPF and the base station is added with an SN in the existing protocol layer, which can be a GTP-U data packet. After the source base station (RAN node-1) receives the first duplicate data packet, the source base station sends a correspondence between the PDCP layer SN (referred to as PDCP SN) and the GTP-U SN (referred to as GTP SN) of the first duplicate data packet to the target base station (RAN node-2). Based on this, the target base station can keep the SN of the PDCP of the first duplicate data packet consistent with the SN value of the PDCP currently used by the source base station, and the SN values sent later will remain synchronized, as shown in FIG. 9.

Here, there are three ways for the RAN node-1 notifying RAN node-2 of the correspondence between PDCP SN and GTP SN of the duplicate data packet: Node-1 informs Node-2 via the Xn interface; Node-1 sends the correspondence to the core network through the N2 interface, and the core network sends it to Node-2; Node-1 notifies Node-2 via an air interface message (such as RRC Connection Reconfig).

Figure 10:
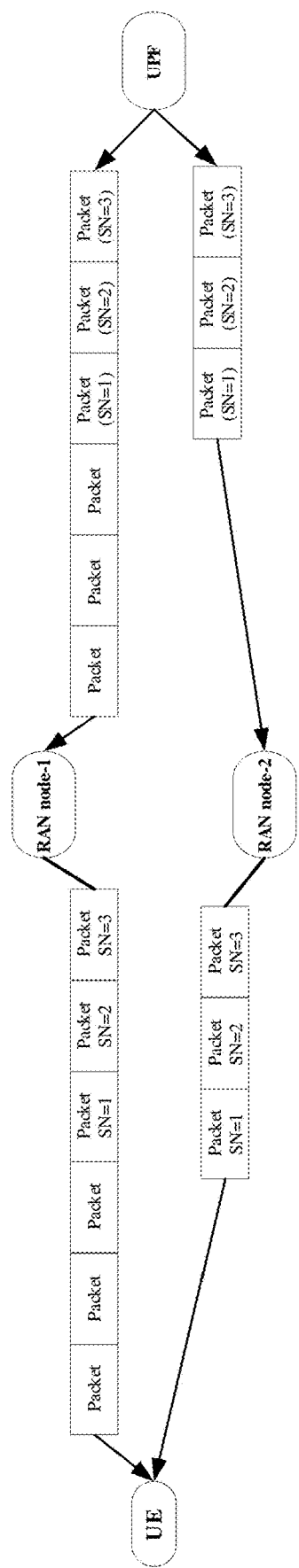
FIG. 10 is a second schematic diagram of reordering data packets according to an embodiment of the present disclosure.

2) The added SN is transparently transmitted to the UE at the RAN base station side, and the added SN can be included on the GTP-U protocol layer. For downlink data, when the duplicate data packet is sent by the UPF, the SN is directly transmitted to the UE, and the UE parses the SN of the packet in this layer to complete the reordering of the data packet. For the uplink data, in a similar way, the duplicate data is sent by the UE and is parsed by UPF, as shown in FIG. 10.

Figure 7:
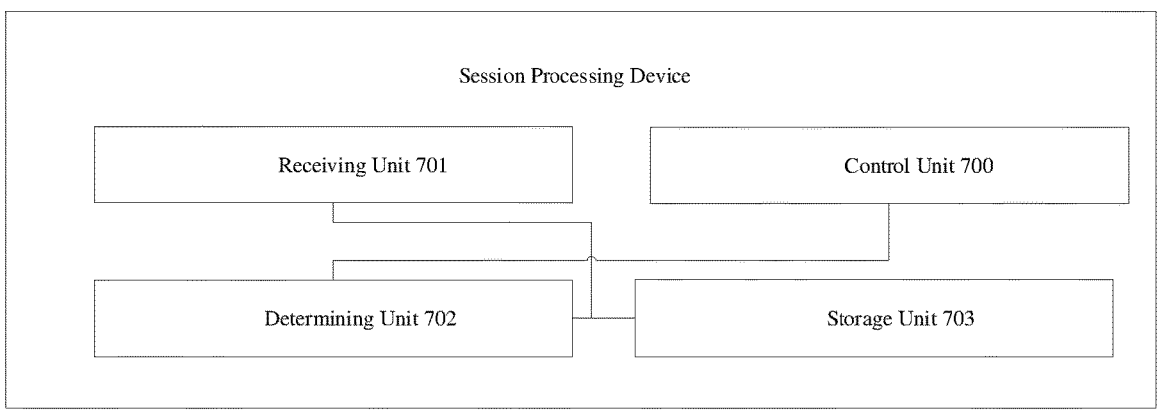
FIG. 7 is a schematic structural composition diagram of a session processing device according to an embodiment of the present disclosure.

FIG. 7 is a schematic structural composition diagram of a session processing device according to an embodiment of the present disclosure. As shown in FIG. 7, the session processing device includes a control unit 700, configured to perform a first type transmission and/or a first type handover process on a PDU session and/or a data stream in the PDU session. The first type of transmission includes a network side and a terminal side perform data copy type transmission on a data packet through multiple paths, and/or perform a first priority transmission on the data packet. The first priority transmission refers to that the transmitted data stream corresponds to a set of specific QoS parameters.

The first type of handover process includes before an air interface data radio bearer is handover from a first base station to a second base station, a second core network element completes establishment of a first path with the first base station and establishment of a second path with the second base station; after the air interface data radio bearer is handover from the first base station to the second base station, the second core network element releases the first path with the first base station.

In an embodiment, a process of the air interface data radio bearer is handover from the first base station to the second base station includes when the air interface data radio bearer is established between the terminal and the first base station, the air interface data radio bearer is directly handover from the first base station to the second base station; or, when the air interface data radio bearer is established between the terminal and the first base station, the air interface data radio bearer with the second base station is simultaneously established, and then the air interface data radio bearer with the first base station side is released.

In an embodiment, the device further includes: a receiving unit 701; after the third core network element receives the handover request sent by the first base station, the receiving unit 701 receives the session establishment or modification request message sent by the third core network element, the handover request message carries PDU session identification information and/or data stream identification information, and the session establishment or modification request message carries the PDU session identification information and/or the data stream identification information; wherein, the PDU session identification information includes the PDU session identification information on the first base station side and/or at least one second PDU session identification information, the at least one second PDU session, and the PDU session on the first base station side have a first association relationship.

In an embodiment, the second core network element releases the first path with the first base station includes the terminal sends a request message to the first core network element to release the PDU session on the first base station side, so that the first core network element triggers the second core network element to release the PDU session on the first base station side; or, the first core network element triggers the second core network element to release the PDU session on the first base station side.

In an embodiment, the device further includes: a receiving unit 701; in a process of performing the air interface handover by the first base station and the second base station the receiving unit 701 receives a session establishment or modification request message sent by the first base station and/or the second base station, the handover request message carries PDU session identification information and/or data stream identification information, and the session establishment or modification request message carries the PDU session identification information and/or the data stream identification information; the PDU session identification information includes PDU session identification information on the first base station side and/or at least one second PDU session identification information, the at least one second PDU session and the PDU session on the first base station side have a first association relationship.

In an embodiment, a process of performing the air interface handover by the first base station and the second base station includes the first base station sending a handover request message to the second base station; the second base station sending a handover reply message to the first base station; the first base station and the second base station completing the air interface handover at the terminal side.

After the second base station sends the handover reply message to the first base station, the receiving unit 701 receives a session establishment or modification request message sent by the second base station; and/or, after the first base station and the second base station complete the air interface handover for the terminal side, the receiving unit 701 receives the session establishment or modification request message sent by the first base station.

In an embodiment, the second core network element releases the first path with the first base station includes the second base station sends a path handover request message to a third core network element; the third core network element sends a session modification request message to the first core network element, so that the first core network element triggers the second core network element to release the PDU session on the first base station side.

In an embodiment, the PDU session identification information and/or data stream identification information is used to indicate whether to perform a first type of handover.

In an embodiment, the device further includes a receiving unit 701, configured to receive a session establishment or modification request message, wherein the session establishment or modification request message carries PDU session identification information and/or data stream identification information and/or slice selection assistance information SNSSAI and/or DNN information; and a determining unit 702, configured to determine whether to perform a first type transmission and/or a first type handover process on the PDU session and/or a data stream in the PDU session based on information in the session establishment or modification request message.

In an implementation manner, the determining unit 702 is configured to determine whether to perform the first type of transmission and/or the first type of handover process on the PDU session and/or the data stream in the PDU session based on the SNSSAI and/or the DNN and/or a first policy in the session establishment or modification request message.

The first policy includes at least one set of Policy Control and Charging (PCC) policy information and/or correspondence between the S-NSSAI and/or the DNN and first indication information, and the first indication information is used to indicate whether to perform the first type transmission and/or the first type handover process.

In the embodiment of the present disclosure, the session establishment or modification request message includes two pieces of PDU session identification information and/or data stream identification information.

The first core network element determines whether to perform the first type transmission and/or the first type handover process on all or part of the data stream of the two PDU sessions based on the two pieces of PDU session identification information and/or the data stream identification information.

In the embodiment of the present disclosure, the terminal initiates session establishment or update requests twice, wherein a first session establishment or modification request message carries a first session identifier, and a second session establishment or modification request message carries the first session identifier and a second session identifier; and/or, the first session establishment or modification request message carries a first data stream identifier, and the second session establishment or modification request message carries the first data stream identifier and a second data stream identifier.

In the embodiment of the present disclosure, the PDU session identifier and/or the data stream identifier carry first information, and the first information is used to indicate execution of the first type of transmission and/or the first type of handover process.

In an embodiment, the device further includes a storage unit 703, configured to store a correspondence between the PDU session identification information and/or the data stream identification information and whether to perform the first type transmission and/or the first type handover process. The determining unit 702 is further configured to, after the receiving unit receives the handover request, based on the locally stored PDU session identification information and/or data stream identification information and whether to perform the first type transmission and/or the correspondence of the class handover process, to determine whether to perform the first type transmission and/or the first type handover process on the PDU session and/or the data stream in the PDU session.

In an embodiment, the first core network element notifies the base station to perform the first type of transmission and/or the first type of handover process on the PDU session and/or the data stream in the PDU session.

In an embodiment, the first policy is configured in at least one of the following network elements: a subscription information database UDM, a policy control network element PCF, and the first core network element.

In an implementation manner, the determining unit 702 is further configured to determine whether to perform the first type transmission and/or the first type handover process on the PDU session and/or the data stream in the PDU session, based on the information in the session establishment or modification request message and/or the first policy and/or the QoS parameters of the data stream in the PDU session.

In an implementation manner, during the first type of handover process, the same IP address is assigned to the first path with the first base station side and the second path with the second base station side, and the PDU session on the first base station side and the PDU session on the second base station side correspond to the same data stream and a QoS policy.

In an implementation manner, during the first type of handover process, different IP addressed are assigned to the first path with the first base station side and the second path with the second base station side, and the PDU session on the first base station side and the PDU session on the second base station side correspond to the same data stream and the QoS policy.

In an embodiment, during the first type of handover process, after the second core network element completes the establishment of the first path with the first base station and the establishment of the second path with the second base station, the same data is sent to the first base station and the second base station simultaneously in a downlink direction, and/or the same data sent by the first base station and the second base station is received in the uplink direction; after the second base station receives the downlink data sent by the second core network element through the second path, before the air interface data radio bearer is handover from the first base station to the second base station, or before the air interface data radio bearer is established on the second base station side, the downlink data is buffered or discarded.

In an embodiment, the first path and the second path belong to the same PDU session.

In an embodiment, the copy type transmission refers to transmitting the same data on two different paths.

In an embodiment, transmitting the same data on two different paths includes on the core network side, the same second core network element transmits the same data on two different paths; or, two different second core network elements transmit the same data on two different paths; on the access network side, the same data is transmitted by two different data bearers of the same base station; or, the same data is transmitted by two different data bearers of two different base stations.

In an embodiment, IP addresses of different paths are different or the same, and the data streams and the QoS policies of the different paths are different or the same.

In the above solution, the data bearers refer to paths and/or links, and different data bearers refer to different paths and/or links on the user plane.

In an embodiment, if the same second core network element transmits the same data on the two different paths on the core network side, the two different data bearers of the two different base stations transmit the same data on the access network side, the second core network element sends the same downlink data packet to the first base station and the second base station simultaneously.

In an embodiment, the data stream identifier of data transmitted on different paths is the same. Or, the data stream identifiers of the data transmitted on different paths are different.

In an implementation manner, the second core network element adds a first sequence number to the same downlink data packet sent by the first base station and the second base station simultaneously.

For downlink data transmission, the first base station notifies the second base station of a correspondence between the first sequence number of one layer in the core network protocol of the downlink data packet and the second sequence number of a layer in the air interface protocol, the second base station parses the received data packet to obtain the first sequence number of the one layer in the core network protocol and sends the second sequence number corresponding to the first sequence number to the second core network element based on the correspondence between the second sequence number and the first sequence number, and the second core network element reorders the data packet based on the second sequence number.

In an embodiment, if the first sequence number in the data packet received by the second base station in the downlink direction is different from the first sequence number in the correspondence, the second base station calculates the second sequence number corresponding to the first sequence number in the data packet based on the correspondence.

In an embodiment, the correspondence is transparently transmitted by the first base station to the second base station through the core network element, or the correspondence is transmitted by the first base station to the second base station through a direct interface between the base stations.

In an implementation manner, the second core network element adds a first sequence number to the same downlink data packet sent by the first base station and the second base station simultaneously.

For upload data transmission, the first base station notifies the second base station of a correspondence between the second sequence number of one layer in the air interface protocol of the uplink data packet and the first sequence number of a layer in the core network protocol, the second base station parses the received data packet to obtain the second sequence number of the one layer in the air interface protocol and sends the first sequence number corresponding to the second sequence number to the second core network element based on the correspondence between the second sequence number and the first sequence number. The second core network element reorders the data packet based on the first sequence number.

In an embodiment, if the second sequence number in the data packet received by the second base station in the uplink direction is different from the second sequence number in the correspondence, the second base station calculates the first sequence number corresponding to the second sequence number in the data packet based on the correspondence.

In an embodiment, the correspondence is transparently transmitted by the first base station to the second base station through the core network element, or the correspondence is transmitted by the first base station to the second base station through a direct interface between the base stations.

In an implementation manner, the one layer in the air interface protocol includes a PDCP layer and/or an SDAP layer, and the one layer in the core network protocol includes a GTP layer.

In an embodiment, the first base station notifies the second base station of the correspondence between the first sequence number and the second sequence number through an Xn interface; or, the first base station sends the correspondence between the first sequence number and the second sequence number to the core network through an N2 interface, and the core network sends the correspondence between the first sequence number and the second sequence number to the second base station; or the first base station notifies the second base station of the correspondence between the first sequence number and the second sequence number through an air interface message.

In an embodiment, after receiving the downlink data packet, the first base station parses the data packet to obtain the first sequence number, and reorders the data packet by the second sequence number of the one layer in the air interface protocol, and determines the correspondence between the first sequence number and the second sequence number of the data packet.

In an implementation manner, the second core network element adds a first sequence number to the same downlink data packet sent by the first base station and the second base station simultaneously.

For downlink data transmission, after the first base station and/or the second base station receive the downlink data packet, the first sequence number in the downlink data packet is transmitted to the terminal, so that the terminal parses the downlink data packet and obtains the first sequence number, and reorders the downlink data packet based on the first sequence number.

In an implementation manner, the terminal adds the first sequence number to the same uplink data packets sent by the first base station and the second base station simultaneously; wherein, for uplink data transmission, after the first base station and/or the second base station receive an uplink data packet, the first sequence number in the uplink data packet is transmitted to the second core network element, so that the second core network element parses the uplink data packet and obtains the first sequence number, and reorders the uplink data packet based on the first sequence number.

In an embodiment, the first sequence number in the data packet is included in a protocol layer above the PDCP layer, the SDAP layer, or the GTP layer.

In an embodiment, when the second sequence number is added to the PDCP layer, the air interface data radio bearer corresponding to the data stream redundantly transmitted by the user plane of the core network is not used for transmission of other data streams.

In an embodiment, after completing the handover of the air interface data radio bearer from the first base station to the second base station or after the establishment of the air interface data radio bearer on the side of the second base station, the second base station starts sending downlink data to the terminal; wherein, if the second base station buffers the downlink data from the network element of the second core network, the buffered downlink data from the network element of the second core network is also sent to the terminal.

Those skilled in the art should understand that the implementation functions of each unit in the session processing device shown in FIG. 7 can be understood by referring to the related description of the foregoing session processing method. The functions of each unit in the session processing device shown in FIG. 7 may be implemented by a program running on a processor, or may be implemented by a specific logic circuit.

In the embodiment of the present disclosure, if the session processing device is implemented in the form of a software function module and sold or used as an independent product, it may also be stored in a computer-readable storage medium. Based on this understanding, the technical solutions of the embodiments of the present disclosure that are essentially or contribute to the existing technology can be embodied in the form of software products. The computer software product is stored in a storage medium and includes several instructions for a computer device (which may be a personal computer, a server, or a network device) is caused to execute all or part of the methods described in the embodiments of the present disclosure. The foregoing storage medium includes various media that can store program codes, such as a U disk, a mobile hard disk, a read only memory (ROM), a magnetic disk, or an optical disk. In this way, the embodiments of the present disclosure are not limited to any specific combination of hardware and software.

Accordingly, an embodiment of the present disclosure further provides a computer storage medium in which computer-executable instructions are stored. When the computer-executable instructions are executed by a processor, the foregoing session processing method in the embodiment of the present disclosure is implemented.

Figure 8:
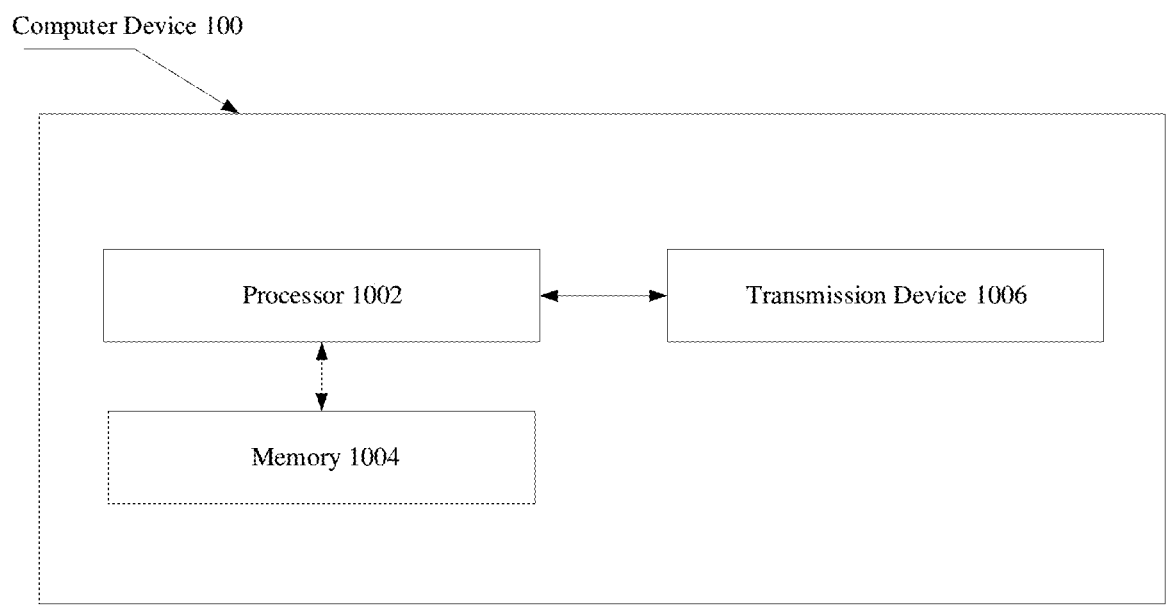
FIG. 8 is a schematic structural composition diagram of a computer device according to an embodiment of the present disclosure.

FIG. 8 is a schematic structural composition diagram of a computer device according to an embodiment of the present disclosure. The computer device may be an access network device or a core network device. As shown in FIG. 8, the computer device 100 may include one or more (only one shown in the figure) a processor 1002 (the processor 1002 may include, but is not limited to, a Micro Controller Unit (MCU) or a Field Programmable Gate Array (FPGA), a memory 1004 for storing data, and a transmission device 1006 for a communication function. A person of ordinary skill in the art can understand that the structure shown in FIG. 8 is only schematic, and it does not limit the structure of the electronic device. For example, the computer device 100 may also include more or fewer components than those shown in FIG. 8, or have a different configuration from that shown in FIG. 8.

The memory 1004 can be used to store software programs and modules of application software, such as program instructions/modules corresponding to the methods in the embodiments of the present disclosure. The processor 1002 executes various functional applications by running the software programs and modules stored in the memory 1004. As well as data processing, the method described above is implemented. The memory 1004 may include a high-speed random access memory, and may further include a non-volatile memory, such as one or more magnetic storage devices, a flash memory, or other non-volatile solid-state memory. In some examples, the memory 1004 may further include memory remotely set with respect to the processor 1002, and these remote memories may be connected to the computer device 100 through a network. Examples of the above network include, but are not limited to, an internet, an intranet, a local area network, a mobile communication network, and combinations thereof.

The transmission device 1006 is used for receiving or transmitting data via a network. The specific examples of the network may include a wireless network provided by a communication provider of the computer device 100. In an example, the transmission device 1006 includes a Network Interface Controller (NIC), which can be connected to other network devices through a base station so as to communicate with the Internet. In one example, the transmission device 1006 may be a radio frequency (RF) module, which is used to communicate with the Internet in a wireless manner.

The technical solutions described in the embodiments of the present disclosure can be arbitrarily combined without conflict.

In the technical solution of the embodiment of the present disclosure, a first type transmission and/or a first type handover process is performed on a PDU session and/or a data stream in the PDU session, wherein the first type transmission includes: a network side and a terminal side perform a data copy type transmission on a data packet through multiple paths, and/or perform a first priority transmission on the data packet, the first priority transmission refers to that the transmitted data stream corresponds to a set of specific QoS parameters; wherein the first type of handover process includes: before an air interface data radio bearer is handover from a first base station to a second base station, an second core network element completes an establishment of a first path with the first base station and an establishment of a second path with the second base station; after the air interface data radio bearer is handover from the first base station to the second base station, the second core network element releases the first path with the first base station. During the handover process, the terminal is in a single-pass mode or a dual-pass mode, and interruption time is limited to an air interface handover process or the air interface handover process is completely uninterrupted and without delay, so that extra delays and interruptions caused by an establishment or modification of links (also called tunnels) on a data plane of a core network side is avoided, thereby realizing a fast handover capability of the cross-base station handover.

In the several embodiments provided in the present disclosure, it should be understood that the disclosed method and smart device may be implemented in other ways. The device embodiments described above are only schematic. For example, the division of the unit is only a logical function division. In actual implementation, there may be another division manner, such as multiple units or components may be combined, may be integrated into another system, or some features can be ignored or not implemented. In addition, the displayed or discussed components are coupled, or directly coupled, or communicated with each other through some interfaces. The indirect coupling or communication of the device or unit may be electrical, mechanical, or other forms.

The units described above as separate components may or may not be physically separated, and the components displayed as units may or may not be physical units, which may be located in one place or distributed to multiple network units; some or all of the units may be selected according to actual needs to achieve the objective of the solution of this embodiment.

In addition, each functional unit in each embodiment of the present disclosure may be integrated into a second processing unit, or each unit may be separately used as a unit, or two or more units may be integrated into a unit; the above integrated unit may be implemented in the form of hardware, or in the form of hardware plus software functional units.

The above is only a specific implementation of the present disclosure, but the scope of protection of the present disclosure is not limited to this. Any person skilled in the art can easily think of changes or replacements within the technical scope disclosed in the present disclosure. It should be covered by the protection scope of the present disclosure.

What is claimed is:

1. A method for session processing, comprising:
   receiving, by a first core network element, a session establishment request message, wherein the session establishment request message carries slice selection assistance information (SNSSAI), and Data Network Name (DNN) information;
   determining, by the first core network element, whether to perform a first type transmission on a Protocol Data Unit (PDU) session, based on a first policy, the SNSSAI and DNN information in the session establishment request message; and
   wherein the first type transmission comprises: performing a data copy type transmission of a data packet through multiple paths between a network side and a terminal side,
   the session establishment request message further carries two pieces of PDU session identification information; and the first core network element determines whether to perform the first type transmission on all or part of data stream of the two PDU sessions, based on the two pieces of PDU session identification information.

2. The method according to claim 1, wherein the first policy comprises at least one set of:
   a correspondence between first indication information and the at least one S-NSSAI and the DNN; and
   Policy Control and Charging, PCC, policy information, wherein the first indication information is used to indicate whether to perform the first type transmission.

3. The method according to claim 1, wherein the copy type transmission refers to transmitting the same data on two different paths.

4. The method according to claim 3, wherein IP addresses of different paths are different or the same, and data streams and Quality of Service (QoS) policies of the different paths are different or the same.

5. A device for session processing, comprising a processor and a memory, wherein the memory is stored thereon computer-executable instructions, and when the computer-executable instructions are executed by a processor, the execution causes the session processing device to:
   receive, by a first core network element, a session establishment request message, wherein the session establishment request message carries slice selection assistance information (SNSSAI), and Data Network Name (DNN) information;
   determine, by the first core network element, whether to perform a first type transmission on a Protocol Data Unit (PDU) session, based on a first policy, the SNSSAI and DNN information in the session establishment request message; and
   perform
   wherein the first type transmission comprises: performing data copy type transmission of a data packet through multiple paths between a network side and a terminal side,
   wherein the session establishment request message further carries two pieces of PDU session identification information; and the first core network element determines whether to perform the first type transmission on all or part of data stream of the two PDU sessions, based on the two pieces of PDU session identification information.

6. The device according to claim 5, wherein the first policy comprises at least one set of:
   a correspondence between first indication information and the at least one S-NSSAI and the DNN; and
   Policy Control and Charging, PCC, policy information, wherein the first indication information is used to indicate whether to perform the first type transmission.

7. The device according to claim 5, wherein the copy type transmission refers to transmitting the same data on two different paths.

8. The device according to claim 7, wherein
   IP addresses of different paths are different or the same; and
   data stream and Quality of Service (QoS) policy of different paths are different or the same.

9. A non-statutory computer storage medium, storing computer-executable instructions, wherein when computer-executable instructions are executed by a processor, steps of a session processing method are implemented, the method comprising:
   receiving, by a first core network element, a session establishment request message, wherein the session establishment request message carries slice selection assistance information (SNSSAI), and Data Network Name (DNN) information;

determining, by the first core network element, whether to perform a first type transmission on a Protocol Data Unit (PDU) session, based on a first policy, the SNSSAI and DNN information in the session establishment request message; and wherein the first type transmission comprises: performing a data copy type transmission of a data packet through multiple paths between a network side and a terminal side, the session establishment request message further carries two pieces of PDU session identification information; and the first core network element determines whether to perform the first type transmission on all or part of data stream of the two PDU sessions, based on the two pieces of PDU session identification information.

10. The non-statutory computer storage medium according to claim 9, wherein the first policy comprises at least one set of:

a correspondence between first indication information and the at least one S-NSSAI and the DNN; and Policy Control and Charging, PCC, policy information, wherein the first indication information is used to indicate whether to perform the first type transmission.

11. The non-statutory computer storage medium according to claim 9, wherein the copy type transmission refers to transmitting the same data on two different paths.

\* \* \* \* \*